(12) United States Patent
Gleman et al.

(10) Patent No.: US 7,024,938 B2
(45) Date of Patent: Apr. 11, 2006

(54) BOLT TENSION GAUGING SYSTEM

(76) Inventors: Stuart M. Gleman, 3561 Alan Dr., Titusville, FL (US) 32780; Geoffrey Keith Rowe, 1022 Antelope Trail, Winter Springs, FL (US) 32708

( * ) Notice: Subject to any disclaimer, the term of this patent is extended or adjusted under 35 U.S.C. 154(b) by 0 days.

(21) Appl. No.: 11/003,090

(22) Filed: Dec. 3, 2004

(65) Prior Publication Data
US 2005/0172725 A1    Aug. 11, 2005

Related U.S. Application Data

(63) Continuation-in-part of application No. 10/266,894, filed on Oct. 8, 2002, now Pat. No. 6,829,944.

(60) Provisional application No. 60/327,774, filed on Oct. 9, 2001.

(51) Int. Cl.
*F16B 31/02* (2006.01)
(52) U.S. Cl. ....................................................... 73/761
(58) Field of Classification Search .......... 73/760–761; 356/32, 34
See application file for complete search history.

(56) References Cited

U.S. PATENT DOCUMENTS 3,561,260 A * 2/1971 Reynolds ...................... 73/761
3,886,840 A * 6/1975 Bossler ......................... 73/761

* cited by examiner

*Primary Examiner*—Max Noori
(74) *Attorney, Agent, or Firm*—Daniel S. Polley, P.A.

(57) ABSTRACT

An apparatus and method for measuring the tension in bolts, screws, rivets, and other fasteners, is disclosed wherein the deformation of the fastener head is measured (or the end of fastener in such cases as there is not a distinct formed head, for example stud bolts). The deformation generally is an analytic function of the tension in the fastener. The deformation is a continuous two-dimensional distribution over the surface of the fastener head, which allows redundant measurement and therefore more reliable measurement of fastener total axial tension, and also allows in some instances an evaluation of the bending stresses in the fastener from the distortion of the deformation pattern on the head. An advantage of the invention is that the length of the fastener or its temperature need not be known. The measurements can be determined by optical, capacitance, optical imaging, air gauging and piezoresistive techniques.

19 Claims, 6 Drawing Sheets

For a Spring Flange

Install with Inside of Flange This Way (e.g. A Hollow Stud Bolt, in Cross-Section)

Embossed Dome

Final Tensioned Shape

Towards Inside of Flange

Note that domes are different heights, since in this application the bolt is bent, with more tension to the inside of the flange.

(More Complicated Form)

BOLT TENSION GAUGING SYSTEM

This application is a Continuation-In-Part of U.S. application Ser. No. 10/266,894, filed Oct. 8, 2002, now U.S. Pat. No. 6,829,944 which claims the benefit of and priority to U.S. Application No. 60/327,774, filed Oct. 9, 2001. Both applications are incorporated by reference.

FIELD OF THE INVENTION

The invention relates generally to determining tension in bolts, and particularly, to a bolt tension gauging system, based on deformations in the head of the bolt.

BACKGROUND OF THE INVENTION

Fasteners are used to hold the plates of a joint together. By "fastener" we include as examples (but do not limit ourselves to), bolts, stud bolts, rods, rivets, etc. In addition to these fasteners, the present invention also applies to such devices as mine ceiling bolts and truss rods.

The axial tension force in the fastener clamps the plates together, or in the case of truss rods, holds nodes of a structure in some constant relation to one another. The problems in providing a known preload tension in a bolted joint are well known. For example a torque wrench used to tension a bolt even in best case provides only a plus or minus 25 percent error in tension, because of the unknown frictional work in torquing the bolt. Bolt elongation methods which consider the bolt as a very massive stiff spring and relate the tension to the measured bolt elongation via Hooke's Law have been used for many decades. The ultrasonic bolt gauge has been around for about 35 years now, and is one of the primary methods of verifying tension in critical bolts. In ultrasonic determination of bolt load, the increased time of flight of an ultrasonic pulse is used to measure increased tension (and therefore elongation and decreased sonic speed) in the fastener.

In any analysis of bolt tension by elongation, it is necessary to know the bolt grip length, and in particular for the ultrasonic methods, the bolt temperature must be known accurately for good tension measurements to be obtained. The impetus to the present invention was the inconvenience in correcting tension loads obtained ultrasonically for temperature and grip length.

Other tensioning techniques such as hydraulic tensioners and bolt heaters are also prone to large errors and require independent verification of preload tension. Other techniques of actual tension verification such as strain gauges are inconvenient and fragile and also prone to performance reliability problems in the sense that a damaged strain gauge will give a wrong reading but not give any indication or signature that the reading is wrong. The present invention actually records a signature pattern for future reference, so that any damage to the bolt (which is itself the indicator of its tension) will be immediately apparent to the operator of our invention.

SUMMARY OF THE INVENTION

A system and method is provided for measuring the preload tension or clamping force in bolts, rivets, and other fasteners; in which the tension is found from the deflection (depression) of the central portion of the fastener head as compared with its unloaded shape.

As the head of a bolt is deformed by the application of tension load to the bolt, the present invention measures this deformation by one of many methods such as Newton's Rings (optical interferometry) or speckle pattern interferometry or even by capacitor arrays or air gap gauge techniques. A deflection for a particular bolt can be calculated and a Newton's Rings experiment then performed, to obtain good agreement between experimental and theoretical values.

The present invention can record a signature pattern for future reference, so that any damage to the bolt (which is itself the indicator of its tension) can be immediately apparent to the operator of the invention.

Thus, the present invention provides a method for measuring the dishing or deformation of a bolt head as a measure of its tension state.

DETAILED DESCRIPTION OF THE INVENTION

Figure 1:
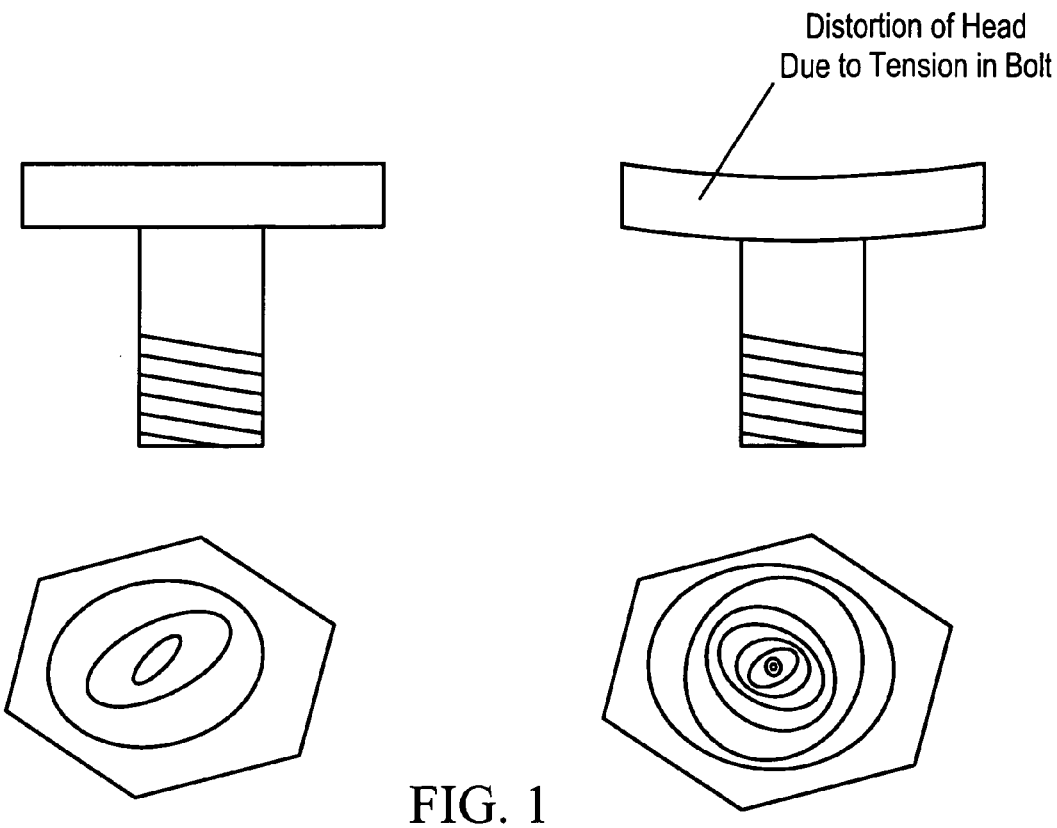
FIG. 1 illustrates various views of a headed fastener in a tensioned and untensioned state.

For the case of a standard bolt fastener, refer to FIG. 1. The untensioned fastener is shown in FIG. 1A, and its distortions due to tension are shown greatly exaggerated in FIG. 1B. The distortions in the head, which can be described as a depression of the center of the head in relation to its edges, can be measured by various techniques. Use of a mechanical depth gauge or sagitta gauge is possible, but in most instances the total depth will be on the order of a thousandth of an inch so that repeatable measurements of this nature with few percent accuracy in the real world may be difficult.

One preferred method for measuring the depression is Newton's Rings type optical interferometry. In this method an optically flat transparent plate is placed in contact with or carefully spaced quite close to the bolt head. It may be necessary to polish the head surface somewhat to make the fringes apparent (i.e. satin finish, etc.) The surface need not be optically flat to get good rings.

The interference pattern for the unstressed bolt can be recorded, for example by a video camera input to a computer or other conventional recording mechanisms, as can be the pattern for the stressed bolt. Comparison of the two patterns yields the overall depth of the depression simply by counting the rings in the interference pattern. If the images are recorded in the computer memory, any subsequent check of bolt tension will allow determination of tension loss or other damage to the bolt, since the shape and number of rings should not change as long as the bolt tension is constant. The ring interferograms are shown for unstressed and stressed bolt heads schematically in FIGS. 1C and 1D.

The invention will be primarily discussed with respect to headed bolts or headed fasteners. However, the invention is not limited to headed bolts/fasteners and can also be used within non headed bolts and fasteners (All of these headed and non-headed bolts and fasteners, for purposes of the specification and claims, will be collectively referred to as "Bolt" or "Fastener"). This definition shall also include fasteners such as, but not limited to, headed rivets, including countersunk aircraft rivets.

The length of the fastener does not affect the distortion of the head, but only the stress in the fastener at the location of the head. This is a particular advantage for such things a s very short aircraft rivets, where the length changes as the opposite end is set (upset, peened over).

Figure 2:
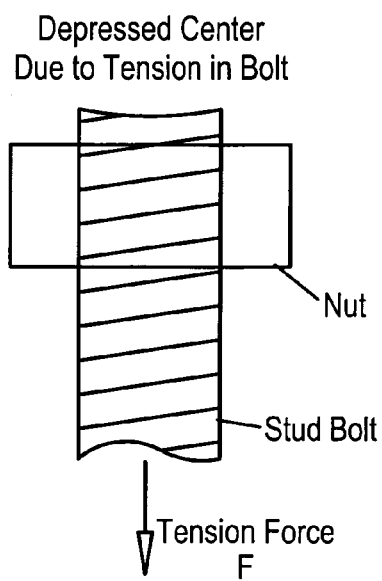
FIG. 2 illustrates a depressed center in a non-headed fastener.

For nonstandard fasteners such as truss rods or ceiling bolts or stud bolts, the same technique is used except that the end of the fastener is observed in the same fashion as the head of the bolt described above (see FIG. 2). Here the distortion will be less than that for a headed fastener, but there will be some distortion due to the local axial shear in the fastener at the location of the thread interface between the fastener and the nut. If a there is a large projection of the threaded end of the bolt past the nut, then the sensitivity of this method is correspondingly reduced. We note in passing that this method can be used on the end of a threaded fastener opposite the head, with similar losses in sensitivity.

Figure 3:
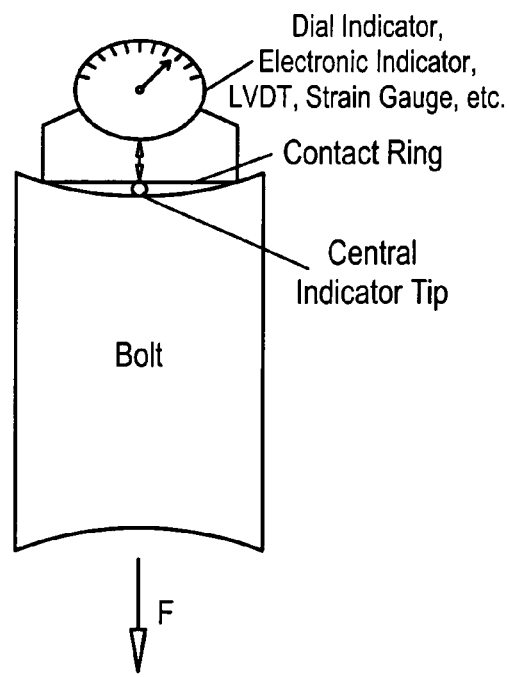
FIG. 3 illustrates a single-point tension indicator version of the present invention.
Figure 4:
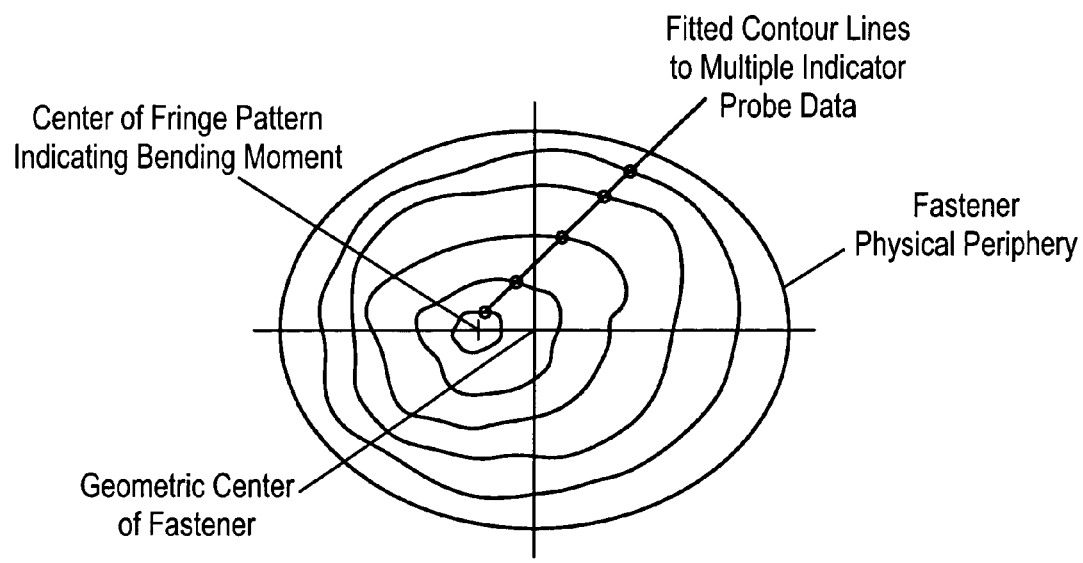
FIG. 4 illustrates a "contour map" in accordance with the present invention.

The depression of the center of the bolt can be measured also by means of electronic depth gauges based on LVDT or strain gauge or other piezoresistive techniques (see FIG. 3). The basic instrument would comprise a contact ring for the periphery of the bolt head with a central contact probe for the center of the head. The center probe would be connected to the LVDT or the piezoresistor element. The instrument would be used to record the unstressed bolts depth reading (positive negative or zero, and then the corresponding stressed reading. The tension would be functionally related to the difference in readings—in most instances simply proportional, but our invention includes nonlinear behavior also. In order to obtain more information on the bolt tension (for example bending or sideloading data) it is possible to use a similar instrument with a peripheral ring (this time with an orientation mark to be aligned with some known azimuthal marking of the bolt head) and a multiplicity of probes to permit a multidimensional "signature" of the bolt head to be obtained. A two-dimensional curve fit to these data point would allow the central depression (magnitude and location) of the head to be calculated. The location of the center relative to the true center of the bolt would permit estimation of the bending loads relative to the axial load of the bolt. (See FIG. 4)

Figure 5:
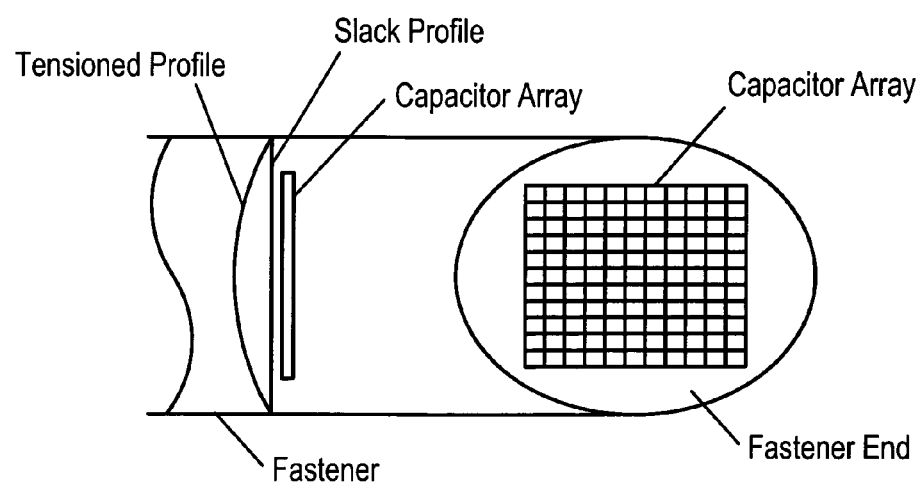
FIG. 5 illustrates a capacitor array version of the present invention.

It is also possible to use a central capacitive probe or an array of capacitive probes (including a planar array of capacitor elements) to locate and evaluate the depth of the central depression of the head of a loaded bolt or other fastener. (See FIG. 5)

Figure 6:
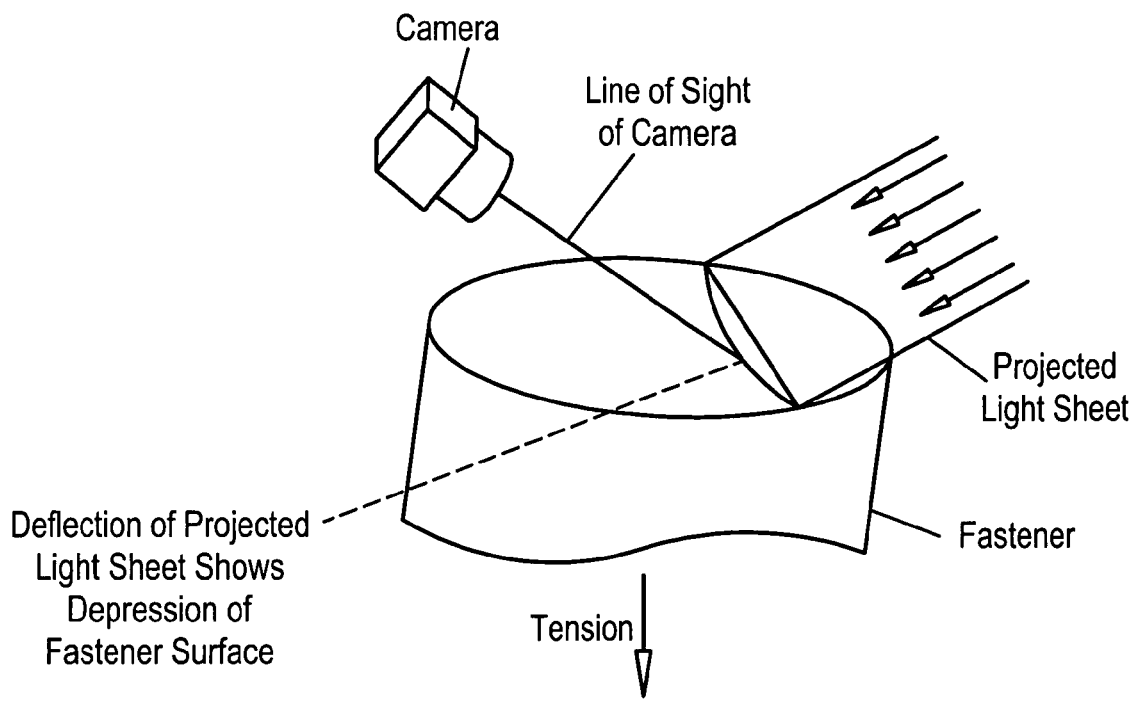
FIG. 6 illustrates a projected structured light microscope version of the present invention.

It is also possible to use structured light to evaluate the magnitude and location of the central depression of a tensioned bolt. (See FIG. 6)

Figure 7:
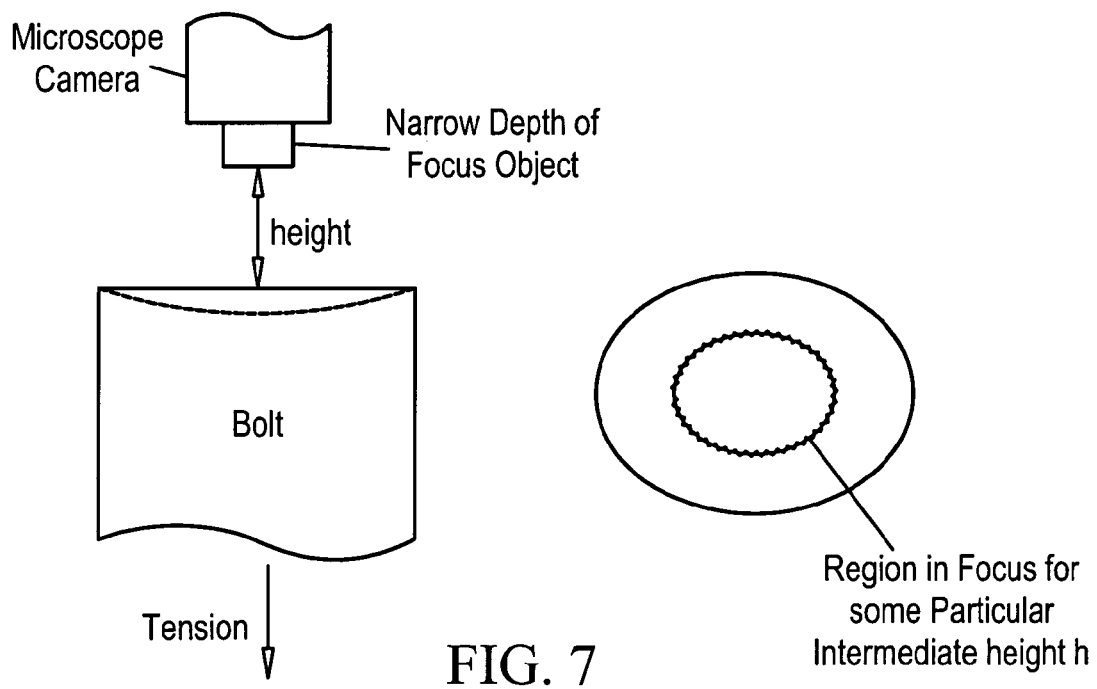
FIG. 7 illustrates a refocus microscope depression measurement version of the present invention.
Figure 8:
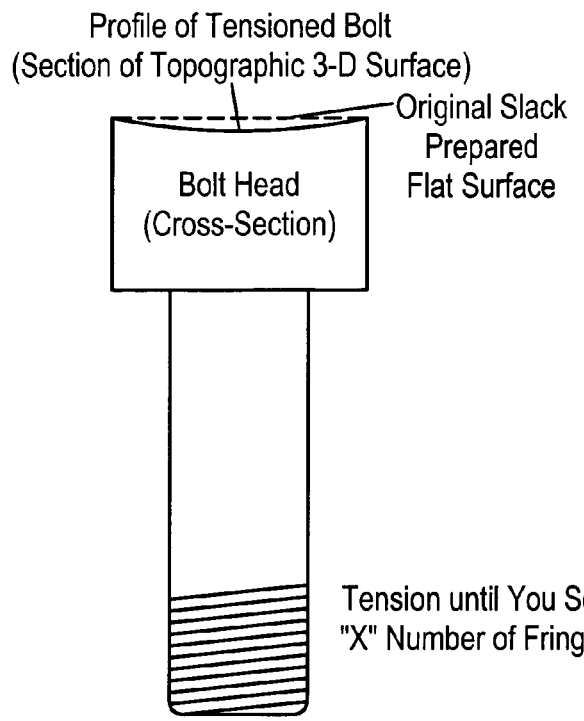
FIGS. 8–12 illustrate further ways in which the present invention can be used to obtain measurements of bolt deformation without a slack measurement.

It is also possible to use a refocusing microscope to evaluate the depth and location of the central depression of a tensioned bolt or other fastener. (See FIG. 7)

For each of the above techniques, time resolved measurements can be accomplished, so that real-time monitoring of bolt loads is possible with the present invention.

Thus, the present invention provides a method for measuring the dishing or deformation of a bolt head as a measure of its tension state. In practice, the deformation may not be symmetric in general, but rather off-center and distorted. The off-centeredness can be used as a measure of the bending moment of the bolt/fastener, and it also has another source in the general (i.e. real world) case. The bolt will in general be placed in a hole that has a larger diameter than the bolt. Thus, as the bolt wanders around laterally, the contour map of the depression in the head as a result of bending will wander and distort also. This can create the problem of sorting out the distortions due to lateral displacement of the bolt in its hole from the bending moment distortions.

One solution employs the physics of the situation as a model in the software that interprets the contour map. The contour map of the depression is gathered by for example, digitizing an image of the optical interference pattern (i.e. Newton's Rings, Electronic Speckle Pattern Interferogram, Moire Interferogram, etc.) or fitting an interpolated or otherwise generated (e.g. using a stress finite element model) to a discrete set of data points (individual point deflections at known points on the bolt head.)

The shape of the distortion of the ideal symmetrical contour basically has two different sources, and two different characteristic shapes, since the deflection of the bolt head is a plate deflection for a centrally loaded plate on a circular ring support, and the deflection of the head for the bending case is one where the loading is not just off center to the ring but also non uniform (alternatively, not perpendicular to the plane of the support ring).

A model the generic bolt head or stud bolt end mathematically can be created (i.e. with a finite-element program or by brute force differential equations). Once the model has been created, a parametric study of how the contour map changes with load, centration of the bolt in its hole, and bending moments can be performed. The resulting model can be stored in the bolt gauge, and the measured contour map can be compared with those in the model to see how much of the effect is to be assigned to axial load, bending, and centration. The original contour of the bolt (which is not necessarily flat) is preferably subtracted out from the measured contour, so that the actual change in contour due to whatever load is applied is measured.

Though some of the drawings may show a single indicator at the center of a cross-section, though included as part of the invention, the invention is not considered limited to such location and other locations are also considered within the scope of the invention. The present invention can scan the indicator to find the location of the maximum depression and thus measure both the tension in the bolt and the bending of the bolt or at least the eccentric loading. This can be important, particularly since at least some bolts are loaded eccentrically by having non-parallel faces on the two joint plates, or wedged washers or for some other reason. The present invention includes scans, such as, but not limited to, raster or spiral scans to map the topography and locate the loading of the bolt relative to the axis of the bolt. However, it should be recognized that a single point central measurement is also within the scope of the invention. Furthermore, another approach is to manually, or by machine control, scan the single point indicator around until the maximum depression is found. With this further approach, the bolt load is obtained by the amount of maximum depression, and the bending moment from its location relative to the geometric axis of the bolt.

Some of the characteristics and features of the present invention include, but are not limited to, the following:

1. A system for measuring the preload tension or clamping force in bolts, rivets, and other fasteners; in which the tension is found from the deflection (depression) of the central portion of the fastener head as compared with its unloaded shape.

2. The system of (1) above, in which the depression of the central portion of the fastener head is used to measure real-time, live loads.

3. The system of (1) above, in which the preload or other tension (or compression) is found by the depression (or protrusion) of the member end for structural members such as truss rods, struts, mine ceiling bolts, and other non-clamping members.

4. The system of (1) above in which the system is calibrated by loading sample bolts, fasteners, or structural members and measuring the central deflections by means of the system.

5. The system of (1) above, in which the system is calibrated by calculating the depressions of the bolts, fasteners or structural members as a consequence of applied loads, based on mechanical properties and geometries of the fasteners or members.

6. The system of 1) above in which calibration is accomplished by any combination of actual loading and calculation.

7. The system of (1) above in which the central depression is measured by means of a single micrometer indicator, whether mechanical, electronic (for example linear variable displacement transducer, inductance proximity sensor, piezoresistive sensor, strain gauge sensor, or capacitance gap sensor), or air gauge.

8. The system of (7) above in which the air gauge is accomplished by 2 or more concentric tubes coaxial with the bolt, wherein the outer tube rests on the fastener surface, and the inner tube is slightly raised above the plane defined by the outer tube end, so that when the fastener is loaded and the gap between the inner tube and the fastener surface increases, there will be an increased gas flow from the inner tube to the outer one (or vice versa) for a given pressure difference between the inner and outer tubes.

9. The system of (1) above in which the central depression of the fastener surface is found by measuring a multiplicity of points over the surface and fitting a smooth two-dimensional surface to the data points, and from which surface both the maximum depression of the surface and its location on the surface of the fastener can be calculated, and from the maximum depression the total axial load can be derived, and from the location the side loads or bending of the fastener can be derived.

10. The system of (1) above, in which optical interferometry for example Newton's Rings accomplished by placing an optical flat against the fastener surface, is used to map the contours of the fastener before and after loading, such contour map being used as a signature of the particular fastener and also used to derive the maximum depression (or protrusion in the case of compressive loading of structural members not fasteners) and location of maximum depression of the fastener, such maximum depression being functionally related to the load and its location measuring side load or bending moments.

11. The system of (1) above, in which moire deflectometry, speckle pattern interferometry, holography, or video deflectometry is used to map the contours of the fastener before and after loading, such contour map being used as a signature of the particular fastener and also used to derive the maximum depression (or protrusion in the case of compressive loading of structural members not fasteners) and location of maximum depression of the fastener, such maximum depression being functionally related to the load and its location measuring side load or bending moments.

12. The system of (1) above, in which an array of capacitive elements is used to map the contours of the fastener before and after loading, such contour map being used as a signature of the particular fastener and also used to derive the maximum depression (or protrusion in the case of compressive loading of structural members not fasteners) and location of maximum depression of the fastener, such maximum depression being functionally related to the load and its location measuring side load or bending moments.

13. The system of (1) above, in which structured light microscopy, in which a projected line is scanned across the surface at an angle from the axis of the bolt, or alternatively a pattern of lines is projected onto the surface at an angle to the surface, and a camera either coaxial to the fastener or at some angle other than the line or grid projector, is used to map the contours of the fastener before and after loading, such contour map being used as a signature of the particular fastener and also used to derive the maximum depression (or protrusion in the case of compressive loading of structural members not fasteners) and location of maximum depression of the fastener, such maximum depression being functionally related to the load and its location measuring side load or bending moments.

14. The system of (1) above, in which refocusing microscopy in which a narrow depth of field microscope is scanned up and down axially above the fastener surface and for each height the section of the surface in focus represents a contour ring, is used to map the contours of the fastener before and after loading, such contour map being used as a signature of the particular fastener and also used to derive the maximum depression (or protrusion in the case of compressive loading of structural members not fasteners) and location of maximum depression of the fastener, such maximum depression being functionally related to the load and its location measuring side load or bending moments.

15. The systems of 1 through 14 above in which time-resolved measurements are obtained so that real-time monitoring of fastener and structural member loading can be accomplished.

16. The systems of 15 above, in which the real-time load values are output from the system to accomplish feedback control of loading equipment for test, stabilization, load compensation, or other purposes.

As seen in FIGS. 8 through 12 illustrate further ways in which the present invention can be used to obtain measurements of bolt deformation (and hence tension) without a slack measurement (i.e. a measurement of the bolt end surface topography with no tension in the bolt). Thus, the bolt or other fastener (including, but not limited to, stud bolts and rivets) can be manufactured (or modified after manufacture but prior to installation) with a set profile (e.g. dead flat) so that the original slack profile is known without measurement, and the deviation from the set profile can be obtained with a single measurement. The term "profile" is defined to mean both a profile along a set line and also a two dimensional profile or surface topography map of any sort including a raster scan of linear profiles.

Thus additional features or uses of the present invention include, but are not limited to, the following:

(1) The preparation of a bolt, stud, tension member or fastener end or head (all collectively referred to as "bolt" or "fastener") during the manufacture or at some time prior to installation, in order to permit measurement of deformation under stress without first obtaining a slack measurement. If you have an accurately flat or at least known topography of the head of the bolt, prior to installation of the fastener, then you do not need a slack picture when the bolt is installed but not yet tensioned. Time and costs are reduced by eliminating the need for obtaining a slack picture of the measurement surface of the fastener.

The present invention is an improvement over ultrasonics, as ultrasonics requires obtaining a slack measurement defining the bolt length to usually one ten thousandth of an inch. In addition, ultrasonics also requires obtaining the bolt temperature usually to a tenth of a Centigrade degree. In certain cases it can be difficult to define the temperature of a bolt within a few degrees (i.e. a ten foot long bolt in a press someplace may vary by 5 degrees along its length, etc.). Use of the present invention optical bolt gauge eliminates the need to obtain a slack measurement of length or a temperature. The bolt is merely put in, tensioned and the bolt gauge is placed on it.

(2) Same as (1) but with an adequately flat surface on the fastener/bolt end to be measured. Making flat ends can be performed by a simple machining operation and can be useful for interferometric and mechanical measurements (See FIG. 8).

(3) Same as (1) but with a specific predetermined shape or profile.

Figure 9:
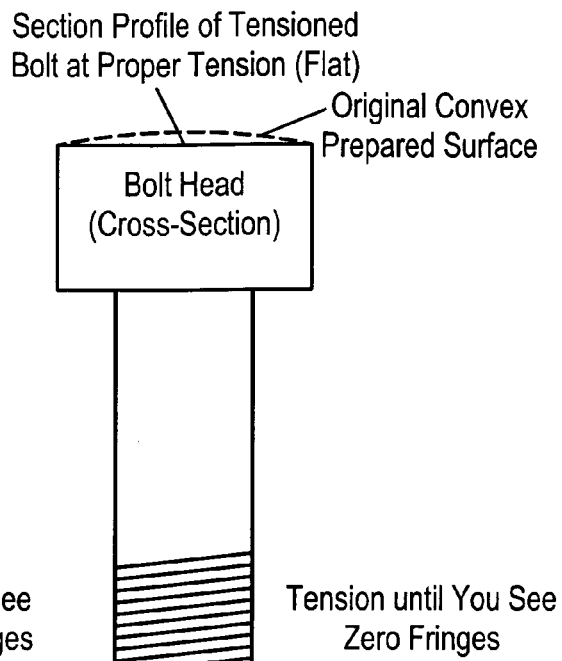

(4) Same as (3) but with a prepared surface such that when the bolt or fastener or tension member is at a specified proper tension, the measurement surface is flat (See FIG. 9). If there is enough of a convex bulge in the head or end, that when it is deformed concave by tension, it can show up substantially dead flat at the proper tension. This again can be useful interferometry and mechanical measurements.

Figure 10:
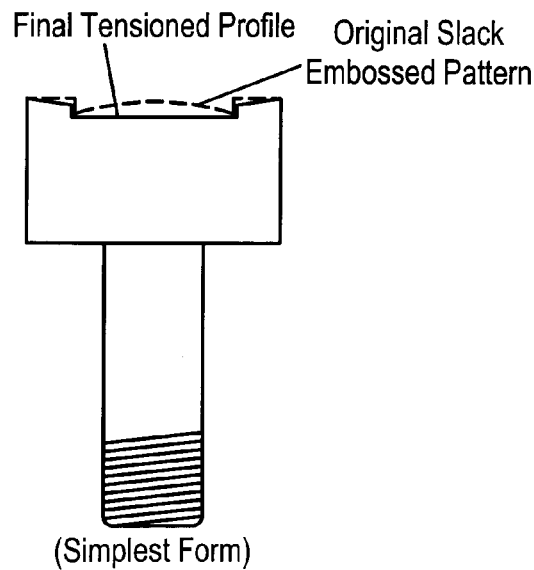
Figure 11:
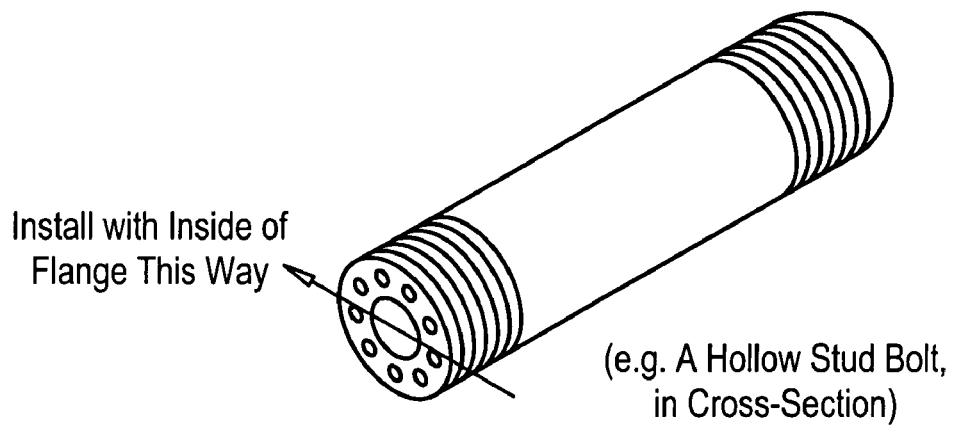
Figure 11:
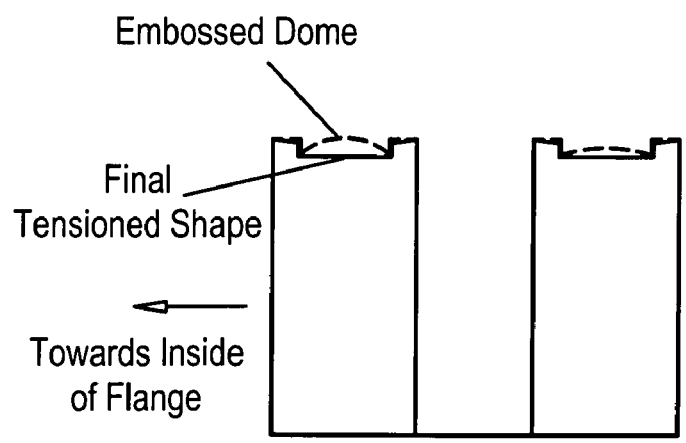
Figure 12:
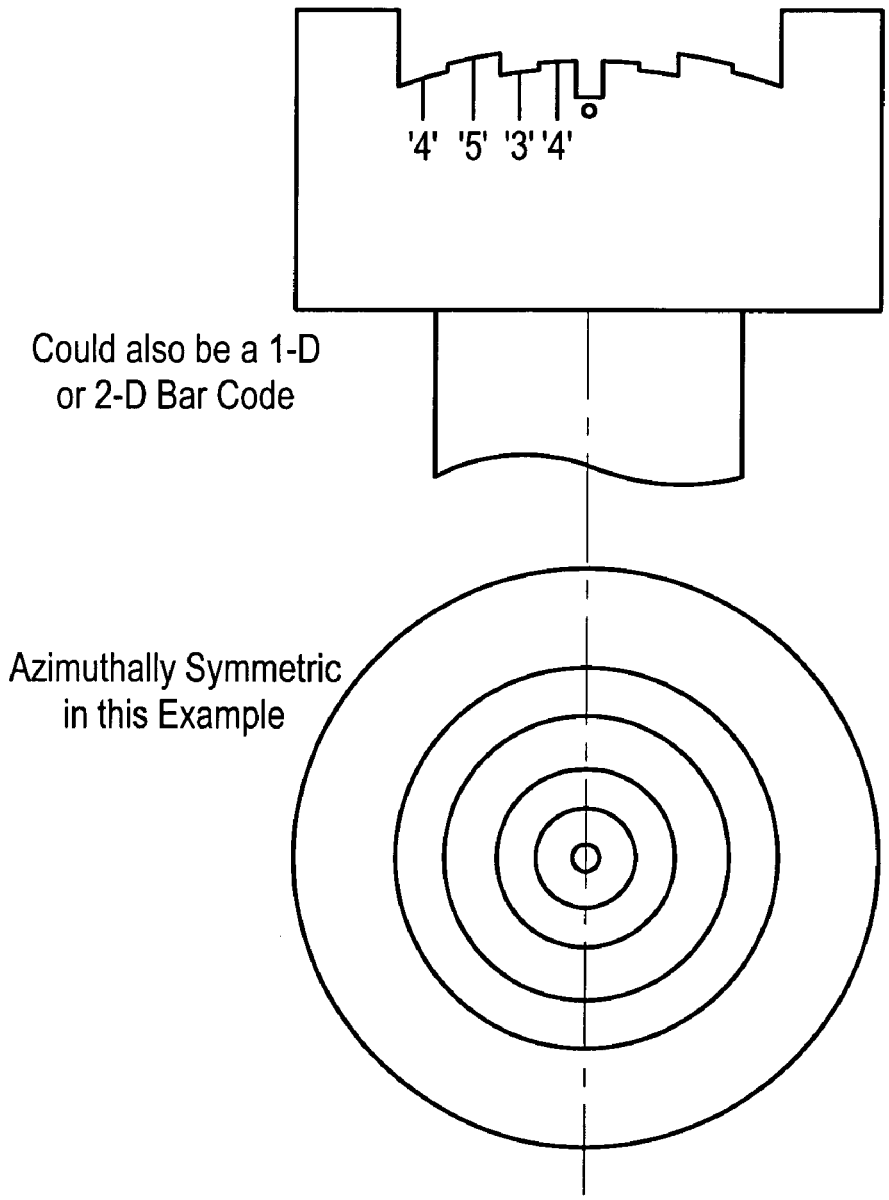

(5) Same as (3) but with an embossed pattern, such that the pattern matches a stored template when the bolt is at proper tension (See FIGS. 10 and 11). In this version, the pattern can be embossed or machined in the measurement end of the fastener, such that it matches a stored pattern when the fastener is properly tensioned. One non-limiting embossed pattern can be to strike a convex dome in the center of the head, such that when the proper tension is applied, the dome goes flat. The stored pattern can be, for example, a zero fringe pattern for interferometric measurements, all capacitances the same for a capacitor array sensor or all distances the same for a mechanical or structured light microscope measurement. This version can also include embossing an array of dots, lines or other features of predetermined depths, such that when the bolt is tensioned, the heights of the dots, lines or other features can match a stored set of values for the array. The number of dots, lines or other features can vary from small (i.e. 5, 10, etc.) to quite large (i.e. on the order of ten thousand, etc.) and any number or amount in between and all are considered within the scope of the invention.

(6): Same as (3) but with embossed information about the particular fastener or tension member, so that when the tension reading is recorded, such as by a video frame grab, photograph, or other means, the specific bolt information is also recorded (See FIG. 12). Where a discrete set of surface features are used, information about the fastener can be encoded. The information can be readily readable by the unaided eye (i.e. bolt serial numbers, etc.) or can be hidden in a code in the features (i.e. watermark for the bolt, etc.). Additionally, the watermark information can be used to set up the bolt gage automatically (e.g. "for this bolt, one ten-thousandth of an inch center deflection corresponds to 547.3 pounds of tension", etc.).

(7) Same as (6) but with the embedded information readable by the computer, so that the file computations and data storage is automatically accomplished. The encoded information can be used to automatically set up the bolt gage computer or tell the human operator how to handle the acquired readings.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for comparing the contours of an end surface of a fastener for identifying any differences in tension state of the fastener, the method comprising the steps of:
    (a) manufacturing or modifying a fastener to a set profile so that an original slack profile for the fastener is known without measurement prior to the fastener's installation;
    (b) obtaining a measurement of the profile of the fastener after installation of the fastener; and
    (c) comparing the known original slack profile to the measured profile obtained in step (b) to determine with a single measurement any deviation in profile from the known original slack profile and without having to obtain a slack measurement for the fastener;
    wherein the profile is along a set line, an entire curve along a diameter, or a two dimensional profile or surface topography map of at least a majority of a fastener head or fastener end surface.

2. The method of claim 1 wherein any found differences between the known original slack profile and the obtained measurement of the profile represents a change in tension in the fastener.

3. The method of claim 1 further comprising the step of recording the obtained measurement of the profile of the fastener after installation.

4. The method of claim 1 wherein the obtained measurement measures deformation of a fastener head or fastener end under stress.

5. The method of claim 1 wherein in an untensioned state the fastener having a prepared flat surface on the end or head to be measured; wherein step (b) measures an overall change in topography of the fastener end of head to locate the actual point of maximum depression with respect to an axis of the fastener.

6. The method of claim 1 wherein the fastener has a convex surface prior to installation on the end to be measured such that when the fastener is properly tensioned the originally convex surface is substantially flat.

7. The method of claim 1 wherein the fastener has an embossed or machined pattern, such that the pattern matches a stored template or pattern when the fastener is properly tensioned.

8. The method of claim 7 wherein providing an embossed pattern for the fastener is accomplished by striking a convex dome in a center of the fastener head, such that when the proper tension is applied, the dome goes flat.

9. The method of claim 7 wherein said stored pattern is a zero fringe pattern for interferometric measurements, all capacitances the same for a capacitor array sensor or all distances the same for a mechanical or structured light microscope measurement.

10. The method of claim 7 wherein said stored pattern is an embossed array comprising one or more of the following: dots, lines or other features of predetermined depths, such that when the fastener bolt is tensioned, the heights of the dots, lines or other features can match a stored set of values for the array.

11. The method of claim 7 wherein a number of dots, lines or other features in the embossed array can range anywhere from about 5 in number to about 10,000 in number.

12. The method of claim 7 further comprising the step of recording a tension reading and specific bolt information contained within the embossed or machined pattern.

13. The method of claim 12 wherein said recording of the tensions reading and specific bolt information is recorded by a video frame grab or photograph.

14. The method of claim 7 wherein said embossed or machined pattern is a discrete set of surface features to encode or embed information about the fastener.

15. The method of claim 14 wherein said encoded or embedded information is read by a computer so that file computations and date storage are automatically accomplished.

16. The method of claim 14 further comprising the step of automatically setting up a bolt gauge computer or informing a human operator on how to handle acquired readings based on the encoded or embedded information,
information can be readily readable by the unaided eye (i.e. bolt serial numbers, etc.) or can be hidden in a code in the features (i.e. watermark for the bolt, etc.). Additionally, the watermark information can be used to set up the bolt gage automatically (e.g. "for this bolt, one ten-thousandth of an inch center deflection corresponds to 547.3 pounds of tension", etc.).

17. The method of claim 5 wherein the distance from the center of the fastener surface to the point of maximum depression of the fastener head or end determines the degree of bending for the tensioned fastener.

18. A method for comparing the contours of an end surface of a fastener for identifying any differences in tension state of the fastener, the method comprising the steps of:
(a) manufacturing or modifying a fastener to a set profile so that an original slack profile in the form of a first contour map is known without measurement prior to the fastener's installation;
(b) obtaining a measurement of. the profile of the fastener in the form of a second contour map after installation of the fastener; and
(c) comparing the first known contour map with the second measured contour map obtained in step (b) for any differences and without having to obtain a slack measurement for the fastener;
wherein the contour map is at least a majority portion of a fastener head or end surface.

19. A method for comparing the contours of an end surface of a fastener for identifying any differences in tension state of the fastener, the method comprising the steps of:
(a) manufacturing or modifying a fastener to a set profile so that an original slack profile in the form of a first contour map is known without measurement prior to the fastener's installation;
(b) obtaining a measurement of the profile of the fastener in the form of a second contour map after installation of the fastener; and
(c) comparing the first known contour map with the second measured contour map obtained in step (b) for any differences and without having to obtain a slack measurement for the fastener;
wherein the contour map is at least a majority portion of a fastener head or end surface;
wherein the obtaining of the second contoured map after installation of the fastener is independent of a temperature or length of the fastener.

* * * * *